(12) United States Patent
Yaginuma et al.

(10) Patent No.: US 10,396,369 B2
(45) Date of Patent: Aug. 27, 2019

(54) FUEL CELL STACK

(71) Applicant: NISSAN MOTOR CO., LTD., Yokohama-shi, Kanagawa (JP)

(72) Inventors: Motoki Yaginuma, Kanagawa (JP); Akira Yasutake, Kanagawa (JP)

(73) Assignee: NISSAN MOTOR CO., LTD., Yokohama-Shi (JP)

( * ) Notice: Subject to any disclaimer, the term of this patent is extended or adjusted under 35 U.S.C. 154(b) by 0 days.

(21) Appl. No.: 15/573,017

(22) PCT Filed: May 13, 2015

(86) PCT No.: PCT/JP2015/063754
§ 371 (c)(1),
(2) Date: Nov. 9, 2017

(87) PCT Pub. No.: WO2016/181523
PCT Pub. Date: Nov. 17, 2016

(65) Prior Publication Data
US 2018/0166708 A1 Jun. 14, 2018

(51) Int. Cl.
*H01M 8/0276* (2016.01)
*H01M 8/242* (2016.01)
(Continued)

(52) U.S. Cl.
CPC ....... *H01M 8/0276* (2013.01); *H01M 8/0271* (2013.01); *H01M 8/1004* (2013.01);
(Continued)

(58) Field of Classification Search
CPC ............. H01M 8/0276; H01M 8/1004; H01M 8/2485; H01M 8/2483; H01M 8/242;
(Continued)

(56) References Cited

U.S. PATENT DOCUMENTS

| 6,610,435 | B1 * | 8/2003 | Maruyama | .......... | H01M 8/0271 |
| | | | | | 429/437 |
| 2008/0233447 | A1 * | 9/2008 | Gemba | ............... | H01M 8/0258 |
| | | | | | 429/433 |

(Continued)

FOREIGN PATENT DOCUMENTS

| EP | 2 579 376 A1 | 4/2013 |
| EP | 3 032 626 A1 | 6/2016 |

(Continued)

*Primary Examiner* — Michael L Dignan
(74) *Attorney, Agent, or Firm* — Foley & Lardner LLP

(57) ABSTRACT

A fuel cell stack FS includes: a plurality of cell modules M each including an integrally stacked plurality of single cells C; a sealing plate P intervened between each of the plurality of cell modules M; a manifold M3 that penetrates the plurality of cell modules M and the sealing plate(s) P in a stacking direction to distribute reaction gas, wherein the sealing plate P includes a sealing member S4 that surrounds and seals the manifold M3 between the sealing plate P and each of the plurality of cell modules M, and the sealing member S4 includes an extended portion E that extends toward the manifold M3 so that an end face F4 of the extended portion E is flush with an inner wall of the manifold M3. Generated water is suitably discharged through the manifold M3 without a decrease of the flowability of the reaction gas and an increase of the production cost.

6 Claims, 9 Drawing Sheets

(51) Int. Cl.
   *H01M 8/249* (2016.01)
   *H01M 8/0271* (2016.01)
   *H01M 8/2483* (2016.01)
   *H01M 8/1004* (2016.01)
   *H01M 8/2485* (2016.01)
   *H01M 8/1018* (2016.01)

(52) U.S. Cl.
   CPC ........... *H01M 8/242* (2013.01); *H01M 8/249* (2013.01); *H01M 8/2483* (2016.02); *H01M 8/2485* (2013.01); *H01M 2008/1095* (2013.01); *Y02P 70/56* (2015.11)

(58) Field of Classification Search
   CPC ............... H01M 8/0271; H01M 8/249; H01M 2008/1095; Y02P 70/56
   See application file for complete search history.

(56) References Cited

U.S. PATENT DOCUMENTS

| | | |
|---|---|---|
| 2012/0040259 A1 | 2/2012 | Tomura et al. |
| 2012/0040268 A1* | 2/2012 | Okanishi ............... H01M 8/026 429/480 |
| 2013/0157160 A1 | 6/2013 | Yoshimura et al. |
| 2013/0157165 A1* | 6/2013 | Takeguchi .......... H01M 8/0247 429/480 |
| 2014/0356739 A1* | 12/2014 | Kuroha .............. H01M 8/04119 429/413 |
| 2015/0050577 A1* | 2/2015 | Numao ............... H01M 8/2485 429/460 |
| 2016/0190610 A1 | 6/2016 | Kageyama et al. |

FOREIGN PATENT DOCUMENTS

| | | | |
|---|---|---|---|
| JP | 2004-213972 A | | 7/2004 |
| JP | 2010-55856 A | | 3/2010 |
| JP | 2010-55892 A | | 3/2010 |
| JP | 4551746 B2 | | 9/2010 |
| JP | 2011-44351 | | 3/2011 |
| WO | WO 2010/119658 A1 | | 10/2010 |
| WO | WO 2012/117676 A1 | | 9/2012 |
| WO | WO2013/013860 | * | 9/2013 ............. H01M 8/02 |
| WO | WO-2015/019714 A1 | | 2/2015 |

* cited by examiner

FUEL CELL STACK

TECHNICAL FIELD

The present invention relates to an improvement of fuel cells such as polymer electrolyte fuel cells, in particular to a fuel cell stack that includes a stacked plurality of single cells and a manifold for distributing reaction gas that penetrates the plurality of single cells in the stacking direction thereof.

BACKGROUND ART

For example, one of such fuel cell stacks in the art is described in Patent Document 1. The fuel cell stack described in Patent Document 1 includes electrolyte-electrode assemblies and metal separators that are alternately stacked in the horizontal direction, in which fluid communication holes (manifolds) for coolant or reaction gas penetrate in the stacking direction. Further, the fuel cell stack is configured such that insulative members are provided to the metal separators to cover the surfaces of the metal separators and the inner walls of the fluid communication holes so that the sealing property against the coolant or the reaction gas is secured by means of the insulative members.

CITATION LIST

Patent Document

Patent Document1: JP 4551746B

SUMMARY OF INVENTION

Technical Problem

In fuel cell stacks as describe above, water is generated along with power generation, and a fluid discharging communication hole (manifold) is used also as a route for discharging the generated water among the fluid communication holes formed in the stacking direction.

In this type of fuel cell stacks, the single cells are likely to be misaligned with each other when a number of single cells are stacked. A structure that has been employed in order to maintain the stacked position and to make the single cells replaceable is such that a predetermined number of single cells are integrally stacked to form a cell module, and a plurality of cell modules and sealing plates for maintaining the sealing property between the cell modules are alternately stacked.

However, a problem with such fuel cell stacks in which cell modules and sealing plates are stacked is that the inner wall of the manifold has an uneven shape particularly in the part where the sealing plates are intervened, and the generated water is likely to be retained inside the manifold. Therefore, it has been required to solve the problem.

For example, a possible measure for preventing such retention of the generated water in the manifold is to cover the entire inner wall of the manifold with an insulative member. However, this results in the high production cost. Further, the flow area is changed depending on the temperature and the compression condition of the insulative member, which may have a negative influence on the pressure loss of the channel and the distribution of fluid to each single cell.

The present invention has been made in view of the above-described problem with the prior art, and an object thereof is to provide a fuel cell stack that includes a manifold for distributing reaction gas in the stacking direction as well as cell modules and sealing plates and that can suitably discharge generated water through the manifold without a decrease of the flowability of the reaction gas and an increase of the production cost.

Solution to Problem

A fuel cell stack according to the present invention includes a plurality of cell modules each including an integrally stacked plurality of single cells, a sealing plate intervened between cell modules of the plurality of cell modules, and a manifold that penetrates the plurality of cell modules and the sealing plate(s) in the stacking direction to distribute reaction gas. In the fuel cell stack, the sealing plate includes a sealing member that is disposed around the manifold between the sealing plate and the cell module to seal the manifold, and the sealing member includes an extended portion that extends toward the manifold so that the end face thereof is flush with the inner wall of the manifold. This configuration corresponds to the means for solving the problem in the prior art.

Advantageous Effects of Invention

In the fuel cell stack according to the present invention which includes the manifold for distributing reaction gas in the stacking direction as well as the cell modules and the sealing plate(s), the unevenness of the inner wall of the manifold is eliminated particularly in the part where the sealing plate is intervened. Therefore, generated water is suitably discharged through the manifold without a decrease of the flowability of the reaction gas and an increase of the production cost.

DESCRIPTION OF EMBODIMENTS

First Embodiment

FIG. 1 to FIG. 4 illustrate a fuel cell stack according to a first embodiment of the present invention.

Figure 1A:
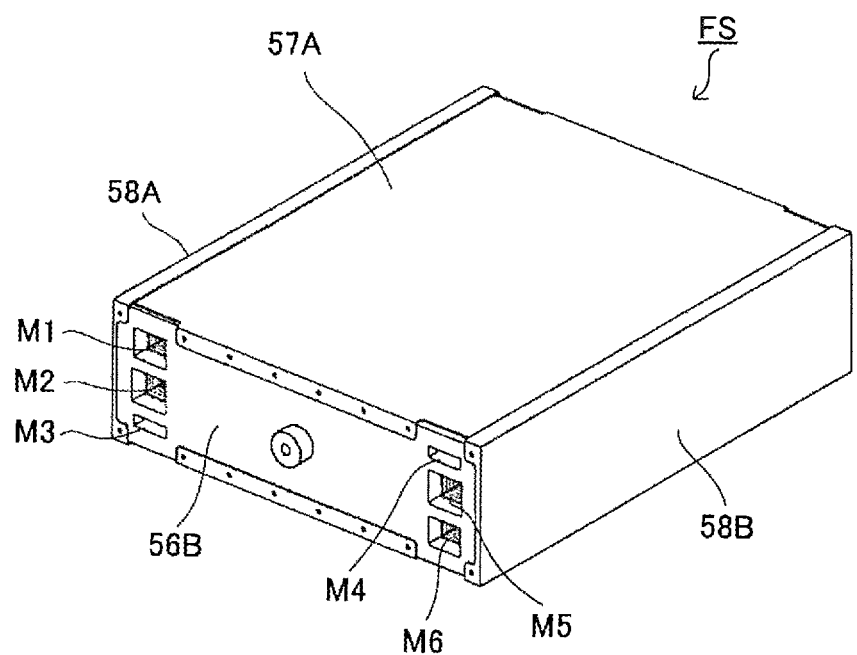
FIG. 1 is (A) a perspective view of a fuel cell stack according to a first embodiment of the present invention and (B) a perspective view of the fuel cell stack in the disassembled state.
Figure 1B:
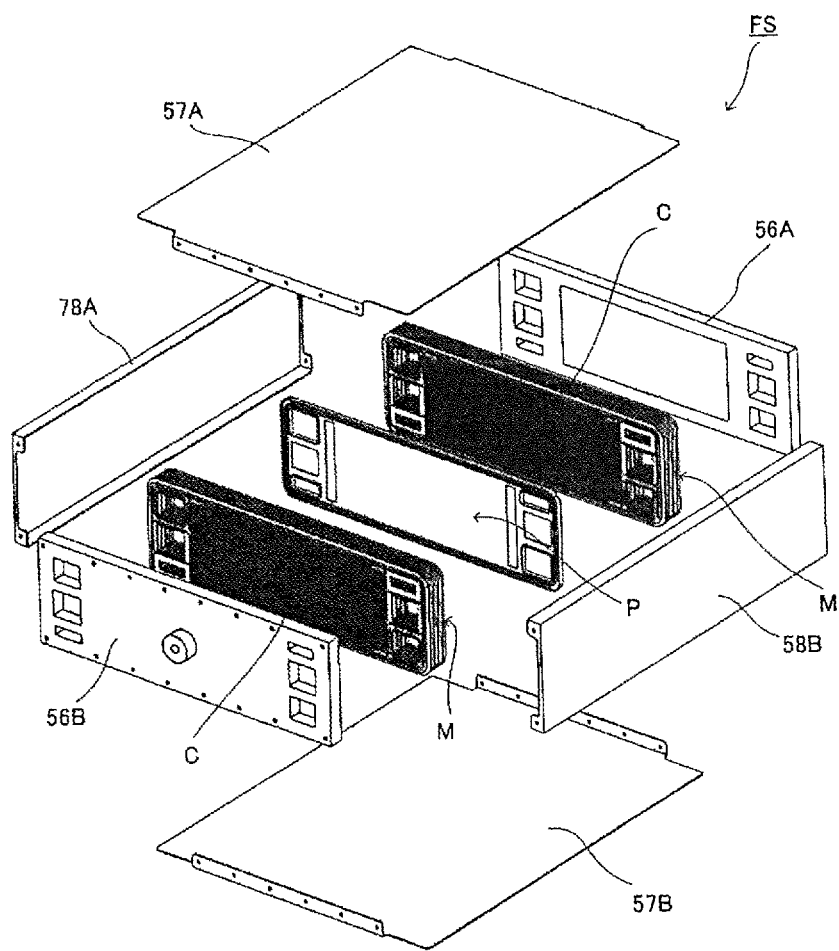

The fuel cell stack FS in FIG. 1 includes a plurality of cell modules M each including an integrally stacked plurality of single cells C, and sealing plates P that are intervened between the cell modules M. While FIG. 1 illustrates two cell modules M and one sealing plate P, a larger number of cell modules M and sealing plates P are stacked in practice.

As illustrated in FIG. 1 (B), the illustrated fuel cell stack FS includes an end plate 56A that is disposed at one end (right end in the figure) in the stacking direction of a stack of the cell modules M and sealing plates P via a current collector plate and a spacer, and an end plate 56B that is disposed at the other end via a current collector plate and a spacer. The fuel cell stack FS further includes fastening plates 57A, 57B that are disposed on both faces (upper and under faces in the figure) of the stack corresponding to the long sides of the single cells C, and reinforcing plates 58A, 58B that are disposed on both faces corresponding to the short sides.

In the fuel cell stack FS, the fastening plates 57A, 57B and the reinforcing plates 58A, 58B are each coupled to both of the end plates 56A, 56B with a bolt B. As described above, the fuel cell stack FS has a case-integrated structure as illustrated in FIG. 1 (A), which restrains and presses the stack in the stacking direction to apply a predetermined contact surface pressure to each of the single cells C and the sealing plates P, so that the gas sealing property, the electrical conductivity and the like are maintained at high level.

As illustrated in FIG. 2, each of the single cells C includes a membrane electrode assembly 1 with a peripheral frame 51 and a pair of separators 2A, 2B holding the frame 51 and the membrane electrode assembly 1 between them, in which anode and cathode gas channels are formed between the frame 51 or the membrane electrode assembly 1 and the respective separators 2A, 2B.

The membrane electrode assembly 1, which is generally referred to as an MEA, has a structure known in the art in which an electrolyte layer of a solid polymer is intervened between an anode electrode layer and a cathode electrode layer although the detailed structure is not shown in the figure.

The frame 51 is integrally formed with the membrane electrode assembly 1 by resin molding (e.g. injection molding). In the embodiment, the frame 51 has a rectangular shape, and the membrane electrode assembly 1 is disposed at the center thereof. Further, the frame 51 has distribution holes H1 to H3, H4 to H6 for distributing reaction gas, which are disposed such that three holes are arranged at both short sides.

The separators 2A, 2B are constituted by rectangular metal plate members having approximately the same length and width as the frame 51. For example, the separators 2A, 2B are made of stainless steel, and one plate has inverted faces to those of the other plate. In the illustrated example, the separators 2A, 2B have an uneven cross section at least at the center part opposed to the membrane electrode assembly 1.

The uneven shape of the separators 2A, 2B continuously extends in the longitudinal direction. The tips of the corrugation are in contact with the membrane electrode assembly 1 while the recesses of the corrugation form the anode and cathode gas channels between the separators 2A, 2B and the membrane electrode assembly 1. Further, the separators 2A, 2B have distribution holes H1 to H6 at the short sides that are formed in the similar manner as the distribution holes H1 to H6 of the frame 51.

The above-described membrane electrode assembly 1 with the frame 51 and the separators 2A, 2B are laminated to each other to form a single cell C. Then, a predetermined number of single cells C are stacked to constitute a cell module M. In each single cell C of the cell module M, the distribution holes H1 to H6 of the frame 51 and the separators 2A, 2B continue to corresponding holes. Between the single cells C, sealing members are provided to form channels for cooling liquid, which are described later.

As illustrated in FIG. 2 (A), each of the sealing plates P is constituted by a single electrically-conductive metal plate that is formed in a rectangular shape having approximately the same length and width as the single cells C. Between the sealing plates P and adjacent cell modules M, the sealing members are provided to form channels for the cooling liquid, which are described later. The sealing plates P have distribution holes H1 to H3 and H4 to H6 on the short sides in the same manner as the single cells C.

In the single cells C and the sealing plates P, the respective distribution holes H1 to H6 communicate to corresponding holes in the stacked position to form manifolds M1 to M6 that continue in the stacking direction as illustrated in FIG. 2 (B). For example, the manifolds M1 to M3 on one end, which is the left side in the figure, are respectively configured to supply cathode gas (M1), to supply the cooling fluid (M2) and to discharge anode gas (M3) in the descending order.

Further, in the single cells C, the manifolds M4 to M6 on the other end, which is the right side in the figure, are respectively configured to supply the anode gas (M4), to discharge the cooling fluid (M5) and to supply the cathode gas (M6) in the descending order. The anode gas is hydrogen-containing gas. The cathode gas is oxygen-containing gas, for example, air. The cooling fluid is, for example, water.

Figure 2A:
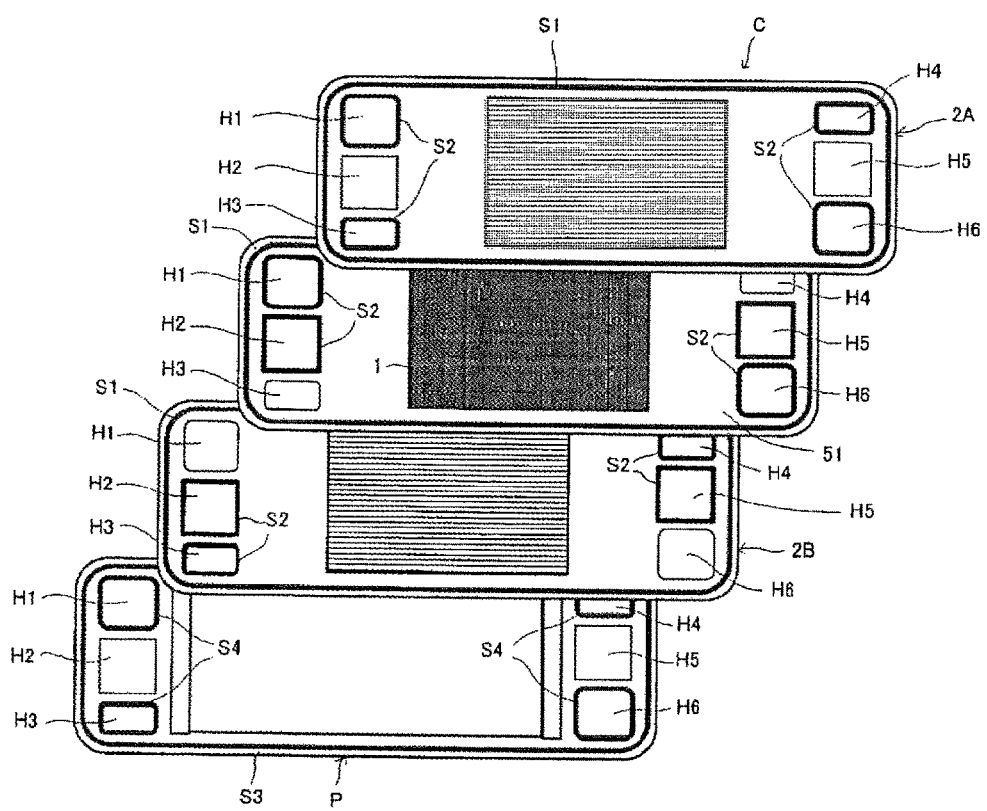
FIG. 2 is (A) a plan view of a single cell and a sealing plate of the fuel cell stack in FIG. 1 in the disassembled state and (B) a plan view of the single cell.
Figure 2B:
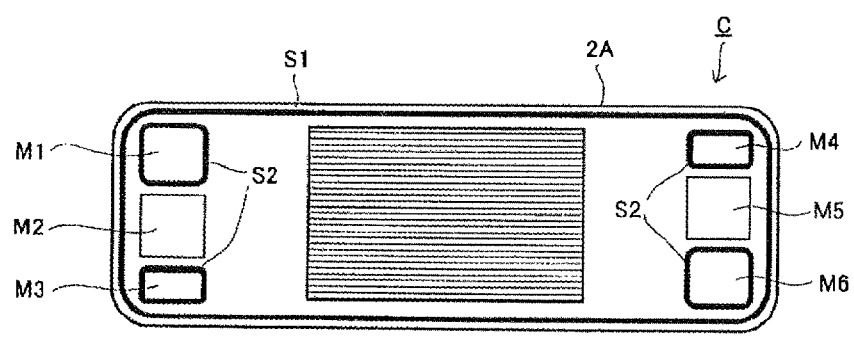

The sealing members S1, S2 are provided between the edges of the frame and each of the separators 2A, 2B of the membrane electrode assembly 1 and around each of the distribution holes H1 to H6. The sealing members S1, S2 may be constituted by adhesive that exhibits sealing property after the members are joined to each other. In order to allow the corresponding fluid to flow between the layers, the sealing members S2 around the distribution holes H1 to H6 are not disposed at the corresponding portions as illustrated in FIG. 2A and FIG. 2B. Alternatively, sealing members (S2) that have an opening (disconnected portion) are disposed at the corresponding portions.

The sealing plates P include the sealing members S3, S4 that are disposed along the edge and around the distribution holes H1 to H6 to seal the gaps between the sealing plates P and the adjacent cell modules M. Since the sealing plates P form the channels for the cooling fluid between the sealing plates P and the cell modules M as described above, the sealing members (S4) are not disposed around the distribution holes H2 (H5) for the cooling fluid or the sealing members (S4), which have openings, are disposed, as illustrated in FIG. 3.

In the fuel cell stack FS in which the above-described single cells C and the sealing plates P are stacked, at least a part of the inner walls of particularly the manifold M3, M6 for discharging the reaction gas is formed in a continuous flat shape that extends in the stacking direction of the single cells C. To be more specific, in the fuel cell stack FS, the end faces (inner walls of the distribution holes H3, H6) of the stacked members, which are the frames 51, the separators 2A, 2B and the sealing plates P, form the inner walls of the manifolds M3, M6 at least a part of which is formed in a continuous flat shape that extends in the stacking direction of the single cells C. That is, the end faces of the stacked members (51, 2A, 2B, P) continue to be flush with each other in at least a part of the inner walls of the manifolds M3, M6.

The fuel cell stack FS of the embodiment is installed such that the long sides of the single cells C are horizontal as illustrated in FIG. 1 (A). In this position, the flat parts of the inner walls of the manifolds M3, M6 are located at least at the lower side with respect to the direction of gravity. In addition to the lower side, the flat parts may extend to the other sides. Further, in addition to the discharging manifolds M3, M6, the inner walls of the supplying manifolds M1, M4 may have a flat part.

Figure 3:
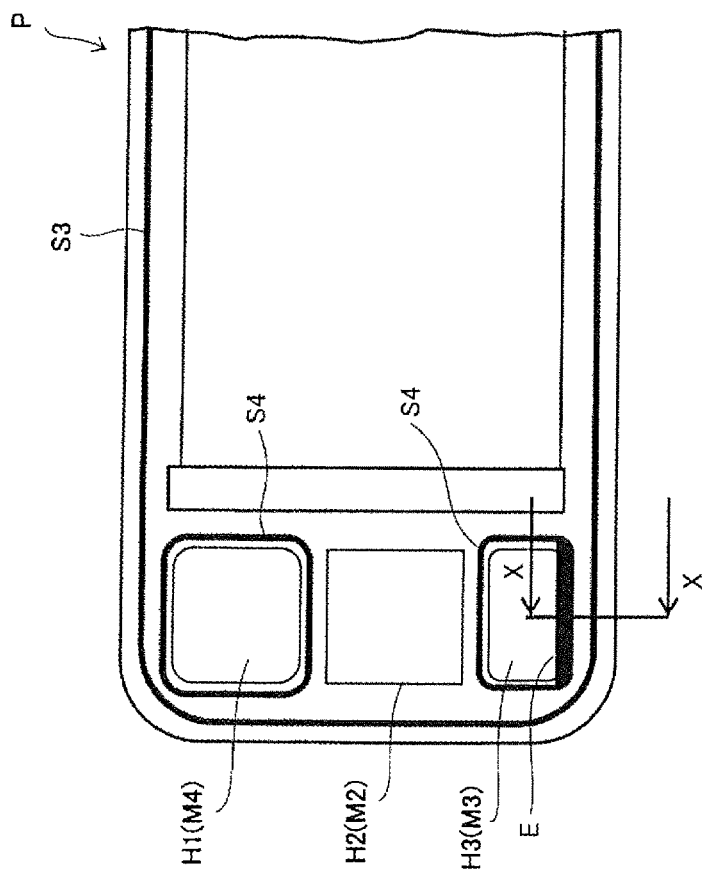
FIG. 3 is a plan view of an end of a sealing plate.
Figure 4A:
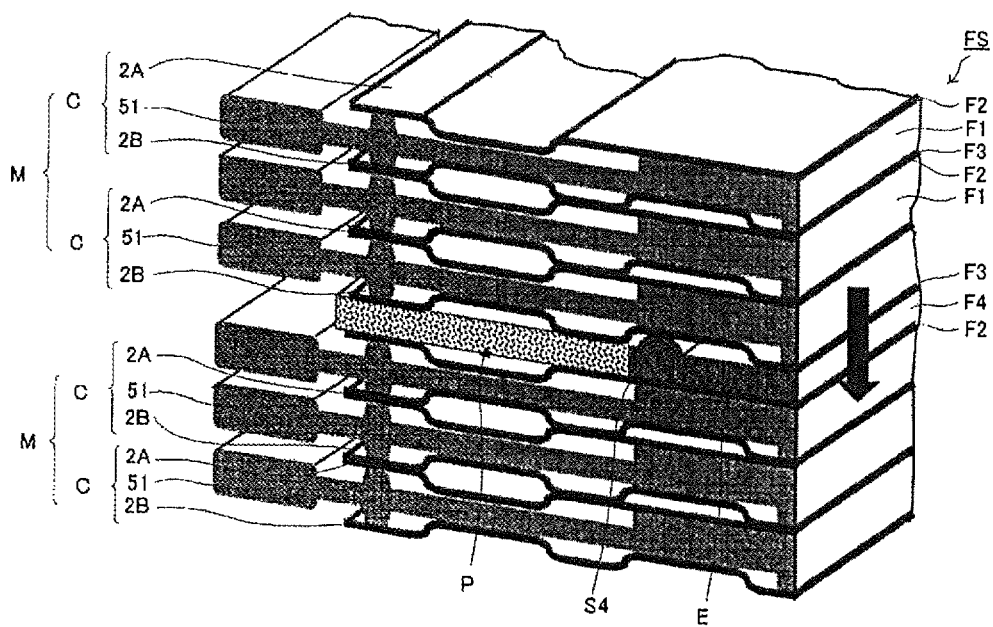
FIG. 4 is (A) a perspective cross sectional view of the main part of the fuel cell stack taken along the line X-X in FIG. 3 and (B) an enlarged cross sectional view of a manifold.
Figure 4B:
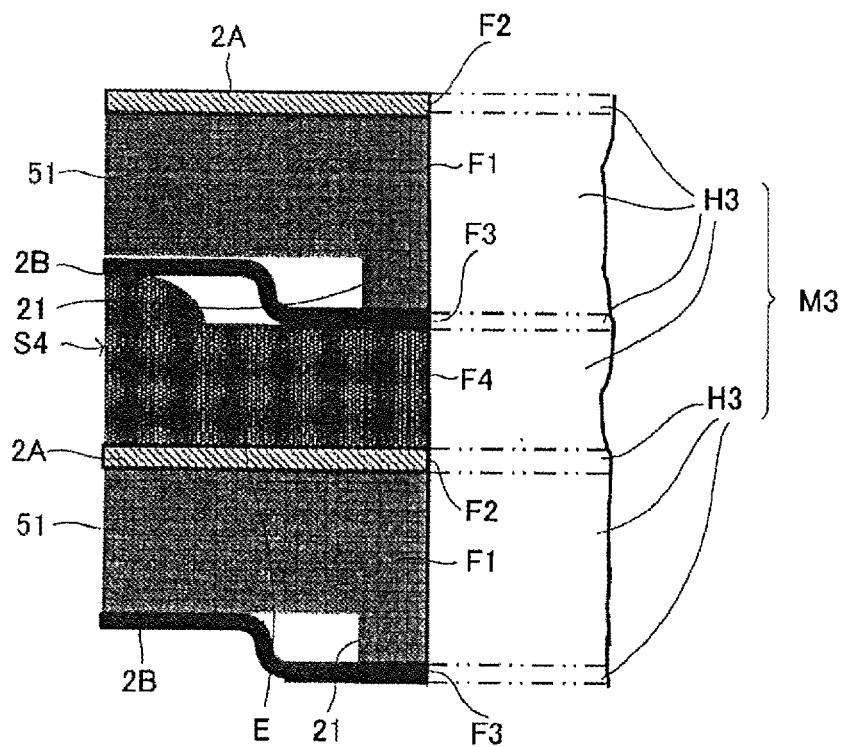

FIG. 4 is a perspective cross sectional view taken along the line X-X in FIG. 3, illustrating the manifold M3 for discharging the anode gas. In FIG. 4 (A), the gas in the manifold M3 flows downward as illustrated by the arrow, but the gas flows in the horizontal direction when the fuel cell stack FS is positioned as described above in FIG. 1.

In the embodiment, as illustrated in the enlarged cross section of FIG. 4 (B), the frames 51 and the separators 2A, 2B of the single cells C and the sealing plates P have flattening faces F1, F2, F3, F4 in the inner walls of the respective distribution holes H3. The flattening faces F1 to F4 continue to be flush with each other so that at least a part of the inner wall of the manifold M3 is formed in a continuous flat shape that extends in the stacking direction of the single cells C.

To be more specific, the frames 51 include integrally formed respective ribs 21 that protrude from the cathode side (lower side in FIG. 4) in the inner peripheries of the distribution holes H3, and the inner walls of the distribution holes H3 including the ribs 21 form the flattening faces F1. The sealing members S1 around the distribution holes H1 to H6 of the single cells C are disposed between the top faces of the ribs 21 and the cathode separators 2B. In this configuration, the above-described openings for distributing the cathode gas may be formed by partly removing the ribs 21. Further, the inner walls of the distribution holes H3 of the separators 2A, 2B respectively form the flattening faces F2, F3.

As illustrated in FIG. 3 and FIG. 4, the sealing plates P include the sealing members S4 that are disposed around the manifold M3 between the sealing plates P and the cell modules M to seal the manifold M3, as described above. The sealing members S4 of the sealing plates P include extended portions E that extend toward the manifold M3 so that the end faces thereof are flush with the inner wall of the manifold M3. That is, in the sealing plates P, the end faces of the extended portions E correspond to the flattening faces F4 that continue to be flush with the inner wall of the manifold M3, and the extended portions E are disposed at the lower side with respect to the direction of gravity as illustrated in FIG. 3.

As described above, in the fuel cell stack FS, at least a part of the inner wall of the manifold M3 is formed in a continuous flat shape that includes the end faces (flattening faces F4) of the extended portions E of the sealing members S4 and extends in the stacking direction of the single cells C. While FIG. 4 illustrates the manifold M3 for discharging the anode gas as an example, it should be understood well that the other manifolds M1, M4, M6 for the reaction gas may have the same configuration.

In the fuel cell stack FS with the above-described configuration, each of the single cells C generates electric power by electrochemical reaction when the anode gas and the cathode gas are supplied respectively to the anode electrode layer and the cathode electrode layer of the membrane electrode assembly 1. Along with the power generation, water is generated. The generated water is discharged mainly through the manifolds M3, M6 for discharging the reaction gas.

In this regard, in the fuel cell stack FS, since the sealing members S4 of the sealing plates P include the extended portions E having the end faces (F4) that are flush with the inner walls of the manifolds M3, M6, the unevenness of the inner walls of the manifolds M3, M6 is eliminated particularly in the parts where the scaling plates P are intervened. Therefore, although the fuel cell stack FS does not require a special member that covers the entire inner walls of the manifolds M3, M6, it can suitably discharge generated water through the manifolds without a decrease of the flowability of the reaction gas and an increase of the production cost.

Since the extended portions E of the sealing members S4 are disposed at least at the lower side of the inner walls of the manifolds M3, M6 with respect to the direction of gravity, the fuel cell stack FS can smoothly and rapidly discharge the generated water.

In the fuel cell stack FS, the frames 51 and the separators 2A, 2B of the single cells C respectively include the flattening faces F1 to F3 in the inner walls of the respective distribution holes H3, and at least a part of the inner walls of the manifolds M3, M6 is formed in a continuous flat shape that includes the end faces (flattening faces F4) of the extended portions E of the sealing members S4 and extends in the stacking direction of the single cells C. With this configuration, the fuel cell stack FS can discharge the generated water more smoothly. Further, the good drainage can prevent corrosion of the components due to the retained generated water even though the end faces (F1 to F4) of the stacked members, which are the frames 51, the separators 2A, 2B and the sealing plates P, are exposed in the inner wall of the manifold M3.

Second Embodiment

Figure 5A:
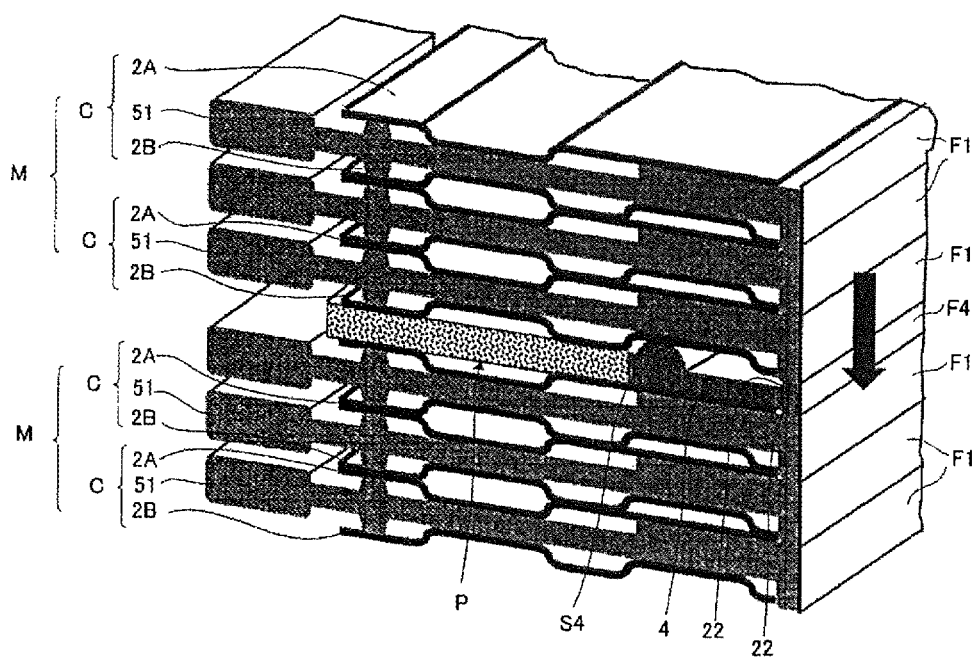
FIG. 5 is (A) a perspective cross sectional view of the main part of a fuel cell stack according to a second embodiment of the present invention and (B) an enlarged cross sectional view of a manifold.
Figure 5B:
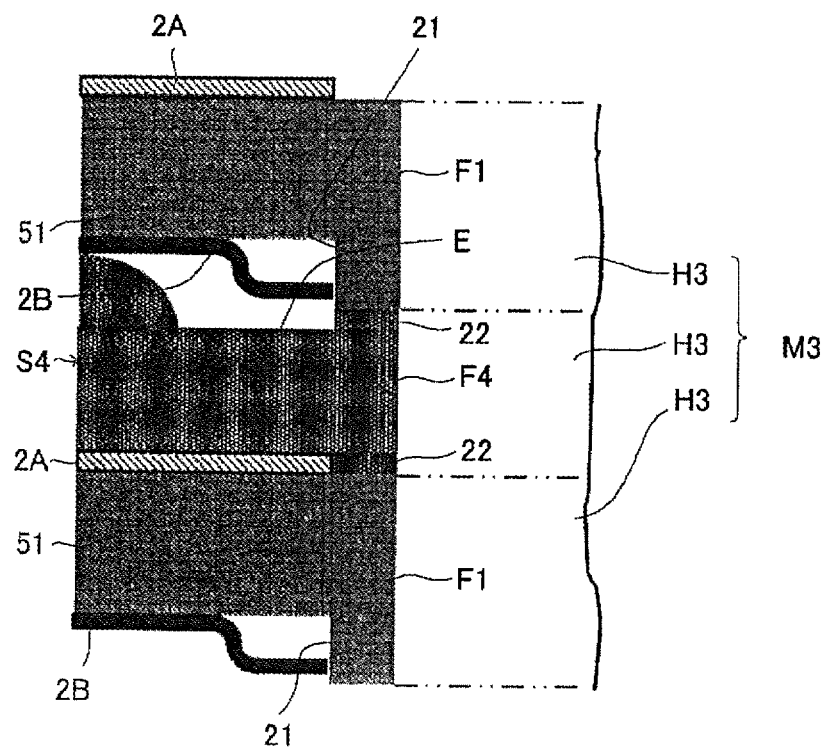

FIG. 5 illustrates a fuel cell according to a second embodiment of the present invention, which is a perspective cross sectional view and an enlarged cross sectional view taken along the line X-X in FIG. 3 as in FIG. 4. That is, FIG. 5 illustrates a manifold M3 for discharging anode gas. The same reference signs are denoted to the same components as those of the first embodiment, and the detailed description thereof is omitted.

In the fuel cell stack FS in FIG. 5, frames 51 of single cells C include respective ribs 21 that are disposed in the inner peripheries (edges) of the distribution holes H3 and protrude from at least one side of the frames 51 to cover the inner walls of distribution holes H3 of the separators 2A, 2B, and have respective flattening faces F1 that include the side walls of the ribs 21. The frames 51 of the illustrated example include the integrally formed ribs 21 that protrude towards the cathode side (lower side in FIG. 5).

Further, sealing plates P include respective ribs 22, 22 that are disposed at the ends of extended portions E of sealing members S4 and protrude towards both sides in the stacking direction to be in pressure contact with cell modules M, M, and have respective flattening faces F4 that include the side walls of the ribs 22, 22. Accordingly, in the fuel cell stack FS of the embodiment, the flattening faces F1, F4 of the frames 51 and the sealing plates P form the inner wall of the manifold M3 in a continuous flat shape that extends in the stacking direction.

As with the previously-described embodiment, the fuel cell stack FS having the above-described configuration can suitably discharge generated water through the manifold M3 without a decrease of the flowability of reaction gas and an increase of the production cost.

Furthermore, in the fuel cell stack FS, the ribs 22, 22 of the extended portions E are compressed between the cell modules M, M, when the cell modules M, M and the sealing plates P are in the stacked state. In the fuel cell stack FS having this configuration, suitable sealing surface pressure is secured between the cell modules M and the sealing plates P, which can prevent the generated water from penetrating into the interlayer gaps more reliably In the fuel cell stack FS, since the inner walls of the distribution holes H3 of the metal separators 2A, 2B are covered with ribs 21 of the resin frames 51, sufficient waterproof function for the separators 2A, 2B can be achieved in combination with the improved sealing property by means of the ribs 22, 22 of the extended portions E.

The configuration of the fuel cell stack of the present invention is not limited to the above-described embodiments. The details of the configuration can be changed or the configurations of the above-described embodiments can be suitably combined without departing from the features of the present invention.

REFERENCE SINGS LIST

1 Membrane electrode assembly
2A, 2B Separator
22 Rib
51 Frame
C Single cell
E Extended portion
FS Fuel cell stack
F1 Flattening face of frame
F2, F3 Flattening face of separator
F4 Flattening face of sealing member
H1 to H6 Distribution hole
M Cell module
M1 Manifold for supplying cathode gas
M3 Manifold for discharging anode gas
M4 Manifold for supplying anode gas
M6 Manifold for discharging cathode gas
P Sealing plate
S1 to S4 Sealing member

The invention claimed is:

1. A fuel cell stack, comprising:
a plurality of cell modules each comprising an integrally stacked plurality of single cells;
a sealing plate intervened between cell modules of the plurality of cell modules;
a manifold that penetrates the plurality of cell modules and the sealing plate between cell modules in a stacking direction to distribute reaction gas, wherein
each single cell of the plurality of single cells comprises a membrane electrode assembly with a peripheral frame and a pair of separators holding the peripheral frame and the membrane electrode assembly therebetween,
the sealing plate has approximately a same length and width as a single cell of the plurality of single cells,
the sealing plate comprises a sealing member that is disposed around the manifold between the sealing plate and a cell module to seal the manifold, and the sealing member comprises an extended portion that extends toward the manifold such that an end face of the extended portion is flush with an inner wall of the manifold.

2. The fuel cell stack according to claim 1, wherein the extended portion of the sealing member is disposed at least at a lower side of the inner wall of the manifold with respect to a direction of gravity.

3. The fuel cell stack according to claim 2, wherein the extended portion of the sealing member comprises a rib that is disposed at a tip and protrudes in the stacking direction to be in pressure contact with the cell module.

4. The fuel cell stack according to claim 1, wherein the extended portion of the sealing member comprises a rib that is disposed at a tip and protrudes in the stacking direction to be in pressure contact with the cell module.

5. The fuel cell stack according to claim 1, wherein
each of the peripheral frame and the pair of separators of each of the single cells, and the sealing plate has a respective distribution hole,
the respective distribution hole of the peripheral frame, the respective distribution hole of each of the pair of separators, and the respective distribution hole of the sealing plate are aligned in a stacked state to form the manifold, and
at least a part of the inner wall of the manifold is formed in a continuous flat shape that includes the end face of the extended portion of the sealing member and extends in the stacking direction of the single cells.

6. The fuel cell stack according to claim 1, wherein the sealing plate comprises an electrically-conductive metal plate.

* * * * *